United States Patent [19]

Miller

[11] 4,241,818

[45] Dec. 30, 1980

[54] LIGHTWEIGHT ELECTROMAGNETIC CLUTCH WITH SHOCK ABSORBER

[75] Inventor: Donald L. Miller, Horseheads, N.Y.

[73] Assignee: Facet Enterprises, Inc., Tulsa, Okla.

[21] Appl. No.: 956,134

[22] Filed: Oct. 30, 1978

[51] Int. Cl.² .......................................... F16D 27/10
[52] U.S. Cl. ........................................ 192/55; 192/54; 192/84 C; 192/106.1; 192/109 R
[58] Field of Search ................ 192/54, 84 C, 109 R, 192/55, 89 B, 93 A, 106.1

[56] References Cited

U.S. PATENT DOCUMENTS

| | | | |
|---|---|---|---|
| 2,138,129 | 11/1938 | Wolfram | 192/54 X |
| 3,205,989 | 9/1965 | Mantey | 192/84 C |
| 3,384,213 | 5/1968 | Bernard et al. | 192/84 C |
| 3,425,529 | 2/1969 | Hayashi | 192/84 C |
| 3,455,421 | 7/1969 | Miller | 192/84 C |
| 3,752,279 | 8/1973 | Briar | 192/84 C |
| 4,079,821 | 3/1978 | Miller | 192/54 X |

*Primary Examiner*—Rodney H. Bonck

*Attorney, Agent, or Firm*—Remy J. VanOphem

[57] ABSTRACT

An electromagnetic clutch is disclosed of the type having an armature member axially movable into frictional driving engagement with an inner body upon energization of an electromagnetic coil, and provided with a torque boosting arrangement consisting of a plurality of balls disposed in opposed corresponding conical pockets formed in ball seats mounted to the armature member and formed into an axially opposed ball plate element. This clutch design features a light weight construction in which most of the drive components are constructed of formed sheet metal, and in which a shock absorber is provided by a molded elastomeric ring located in the space between the ball plate element and a formed cup-shaped driven member enclosing the ball plate element. The shock absorbing material located between radial faces of the cup-shaped element and the ball plate acts to slow the development of the axial force generated by the torque boosting balls, while yielding to act as a torsional shock absorber.

8 Claims, 4 Drawing Figures

4,241,818

LIGHTWEIGHT ELECTROMAGNETIC CLUTCH WITH SHOCK ABSORBER

BACKGROUND OF THE INVENTION

In U.S. Pat. No. 4,079,821, there is disclosed an electromagnetic clutch of the type having an axially movable armature which is drawn into and out of frictional engagement with an inner body by the action of an electromagnetic coil, which engagement serves to establish drive through the clutch. This particular clutch design incorporates a torque boosting arrangement consisting of a plurality of balls disposed between the armature member and the output (or input) drive member with a series of conical pockets formed in the respective armature and drive members, which serves to increase the speed of engagement and the torque capacity of the clutch upon axial movement of the armature into engagement with the inner body, as described in detail in that patent. This clutch operates in a highly advantageous manner in that it exhibits a relatively high torque capacity.

Some applications, however, require a relatively light weight clutch. In the particular design disclosed in that patent, the elements are relatively massive, being formed of machined steel components. In addition, the extremely rapid action of the clutch by virtue of the torque booster feature in some applications requires a shock absorbing feature built into the clutch in order to protect the output shaft from the shock of the sudden engagement of the clutch and/or sudden increases in torque.

One arrangement for providing a shock absorbing action in such clutches has been by the interposing in the drive of a torsional resilient mass of material having suitable resilient shock absorbing characteristics, such as an elastomeric ring which serves to minimize the transmission of torsional shocks.

It is, accordingly, an object of the present invention, to provide an electromagnetic clutch of the design disclosed in U.S. Pat. No. 4,079,821, of a relatively light weight configuration.

It is yet another object of the present invention to provide a clutch of the type described in which a shock absorbing feature is provided which acts in cooperation with the torque booster arrangement to reduce sudden shock loadings.

SUMMARY OF THE INVENTION

These and other objects of the present invention are provided by an electromagnetic clutch design in which a ball plate element opposite the armature is provided with formed conical pockets for engagement by the torque boosting balls, which element is nested within a cup-shaped formed steel member connected to a clutch hub, with the intermediate axial space therebetween occupied by a bonded elastomeric ring acting as a torsional and axial shock absorber.

The armature is constructed of a relatively thin annular disc having inserts forming the conical ball seats, and a special spider return spring enabling a lightweight armature design. The inner body assembly and associated drive pulley are formed to further enhance the lightweight qualities of the design.

DETAILED DESCRIPTION OF THE PRESENT INVENTION

Figure 1:
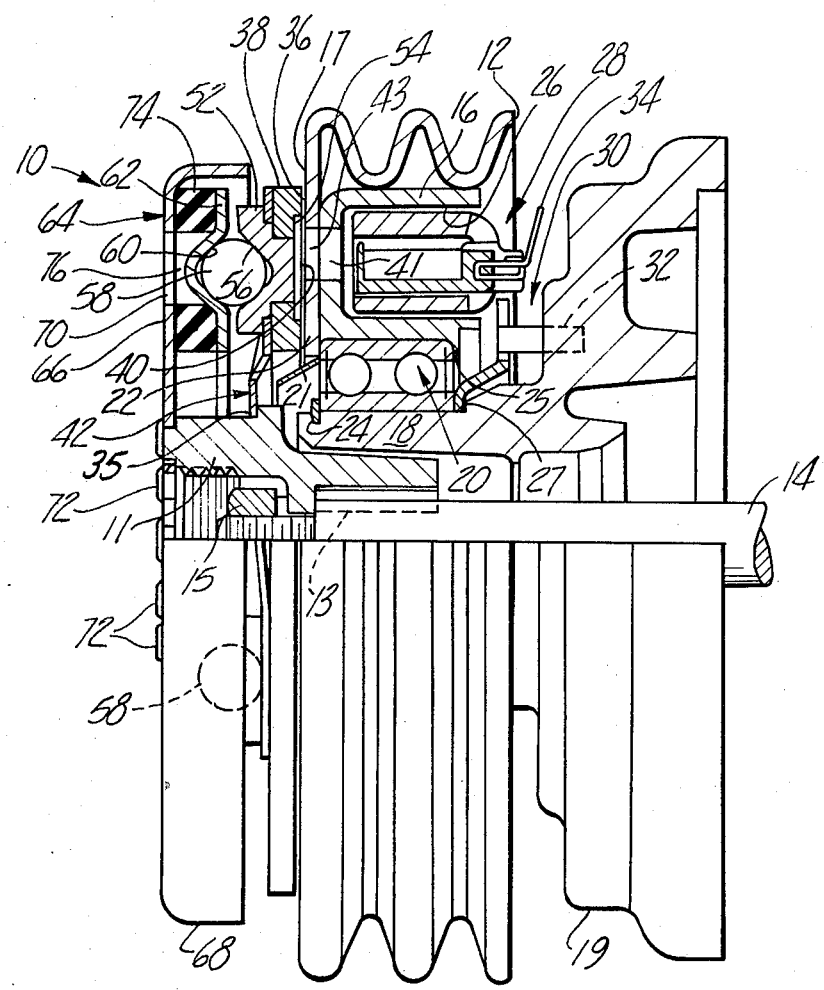
FIG. 1 is a partially sectional view of an electromagnetic clutch design according to the present invention.

In the following detailed description, certain specific terminology will be employed for the sake of clarity and a particular embodiment described in accordance with the requirements of 35 U.S.C. 112. It is to be understood that the same is not intended to be limiting and, indeed, should not be so construed inasmuch as the invention is capable of taking many forms and variations within the scope of the appended claims.

Referring to the drawings, an electromagnetic clutch 10, according to the present invention, is configured to receive an input drive from a drive pulley 12, and to controllably establish rotary drive to a shaft 14 connected to clutch hub 11 by a key 13 and retained axially by a nut 15.

The particular application shown is to an automotive air conditioning compressor drive, with the compressor input being via shaft 14, and the belt driven pulley 12 being driven by the engine crankshaft.

As will be appreciated by those skilled in the art, the drive could be reversed through the clutch unit and the terming of one or the other of the external driving components as driving or driven is dependent only on the particular external driving connections established for the particular application.

Figure 2:
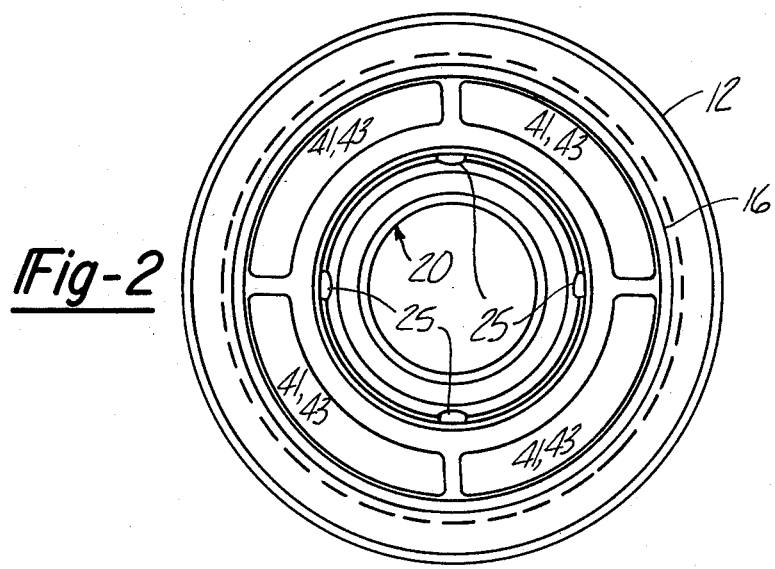
FIG. 2 is an endwise view from the right of the inner body assembly incorporated in the clutch as shown in FIG. 1.

The drive pulley 12 is welded to a ferromagnetic inner body 16 with a radially inward portion 17 of the drive pulley 12 forming the friction engagement surface of the assembly to insure transmitting of torque into the clutch and reduce the stress on the welds forming the connections. The inner body 16 is mounted on an extension 18 of stationary compressor housing 19 by means of an anti-friction bearing assembly 20. The inner body 16 is axially located by means of the terminal portion 22 of the radially inward portion 17 of the drive pulley 12 abutting an axial face of the antifriction bearing assembly 20 and secured by staking at 25 (FIG. 2). A suitable snap retainer 24, and shoulder 27 in turn, axially locates the anti-friction bearing assembly 20 on the extension 18. A bearing shield 21 is also provided to prevent the entrance of dirt, water, etc. into the bearing 20. Further, the bearing shield 21 prevents the bearing lubricant from leaking onto the friction surfaces of the clutch.

The inner body is provided with an annular cavity 26 within which is disposed the electromagnetic coil assembly 28. The coil assembly 28 is mounted to be relatively stationary by means of a retainer arrangement 30 axially located on the extension 18 and pinned at 32 to the compressor housing 19 to position the electromagnetic coil assembly 28 radially and to maintain it stationary with respect to the rest of the assembly.

This coil retaining arrangement is disclosed in detail in U.S. Pat. No. 3,455,421.

Terminals 34 are provided to make connections with the control circuit for energizing the electromagnetic coil 28. A radial face 36 of the portion 17 of the drive pulley 12 is located opposite a ferromagnetic armature member 38 having an oppositely disposed radial face 40. The armature 38 is mounted to be relatively axially movable, so as to be moved axially into and out of engagement with the inner body 16, with the frictional engagement of the radial faces 36 and 40 establishing drive through the clutch unit 10. The axial movement of the armature is induced by energization of the coil assembly 28 creating a magnetic field passing through the inner body 16 and the armature 38 causing a magnetic attraction therebetween. The inner body 16 and radial portion 17 of the drive pulley 12 are provided with circumferential slots 41 and 43 respectively to insure the passage of magnetic flux into the armature 38 in a toroidal path.

Figure 3:
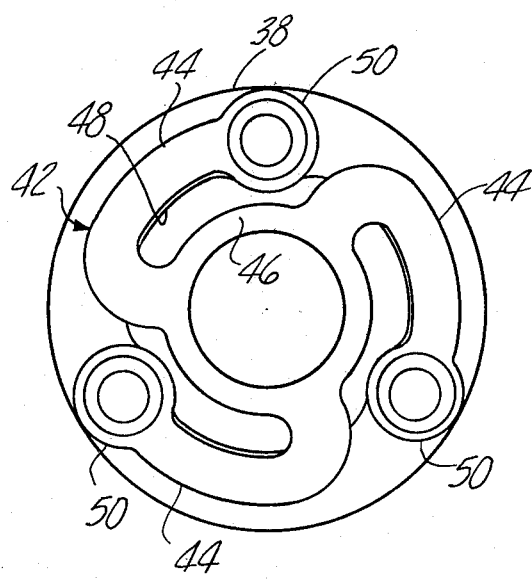
FIG. 3 is an endwise view from the left of the armature assembly incorporated in the clutch as shown in FIG. 1.
Figure 4:
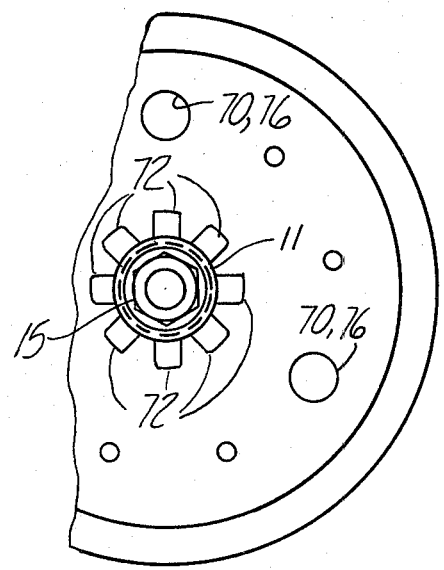
FIG. 4 is an endwise view from the left as viewed in FIG. 1.

The armature 38 is axially biased toward the release position by means of a spider spring 42 received over the clutch hub 11 and in engagement with a shoulder 15 formed on the clutch hub 11. The spider spring 42 is configured with three arms 44 (FIG. 3) emanating from a central portion 46, each arm 44 extending partially about the circumference of a central opening 48 of the armature 38. Each arm 44 has a terminal portion 50 lying against the armature 38 and retained by being mounted beneath ball pocket inserts 52. Ball pocket inserts 52 in turn are received in bores in the armature 38 and staked at 54 to be secured thereto. This arrangement allows the armature to be of lightweight construction. The spider spring 42 allows a relatively large diameter opening 48 while affording sufficient resiliency by the arms 44 extending circumferentially. The ball pocket inserts 52 enable the armature to be relatively thin since the conical pockets 56 are not machined directly into the armature 38. Also, the ball pocket inserts 52 may be manufactured from a relatively hard material while maintaining a softer material for the armature which is also preferably for magnetic purposes. The spider spring 42 is deflected by assembly as shown in FIG. 1 to create a preload return force. Disposed in each pocket 56 is a spherical ball 58, each of which is also disposed in an oppositely located conical pocket 60 formed in a ball plate element 62.

The ball plate element 62 is an annular element having the pocket 56 formed as dimples, and the precise conical form then machined therein. The ball plate element 62 is disposed within a cup-shaped coupling plate 64 having a radially extending portion 66 and a terminal axial extending portion 68 which is reversely oriented to generally enclose the ball plate element 62. Th reverse portions of the ball plate element 62 forming the conical pockets 60 are adjacent openings 70 in the inner radial face of the radial portion 66 of the coupling plate 64, such as to accommodate relative axial movement in the direction created by action of the torque booster balls 58.

The coupling plate 64, in turn, is joined to the clutch hub member 11 by being received into slots machined into the hub 11, and staked securely thereto at 72 to axially and rotationally be fixed to the hub 11.

Intermediate the formed coupling plate 64 and the ball plate element 62 is an axially and radially extending space which is occupied by a ring 74 of a suitable elastomeric material having suitable shock absorbing characteristics which is bonded to both the inner face of the radial extending portion 66 and a radially extending portion of the ball plate element 62 to be capable of yieldably transmitting torque therebetween.

Thus, relative angular movement may take place between the ball plate element 62 and the coupling plate 64. At the same time, the compression of the ring 74 between the radial faces allows relative axial movement such as to enable the torque boosting action to take place more gradually to provide a dual action shock absorption. The ring 74 is also provided with openings 76 opposite the pockets 60 to accommodate this relative axial movement. The ring 74 may be constructed of any suitable material for the particular application, a satisfactory material for one embodiment utilizing uniroyal compound number 1105, Durometer A 40-50.

The outer axially extending portion 68 provides suitable stiffness to the formed steel coupling plate 64 such as to adequately resist the axial forces generated.

Accordingly, it can be seen that the torsional shock absorbing characteristics afforded by the elastomeric has been provided while simultaneously creating an axial resiliency in those members subject to the axial forces induced by the spherical balls 52, to provide a shock absorber for the torque boost action. At the same time, the lightweight construction afforded by the various formed clutch members and the lightweight armature 38 provides a clutch having relatively lightweight characteristics, while having adequate strength and rigidity to resist the imposition of the forces imposed by the torque boosting action, to achieve the advantage of the torque booster design in a relatively lightweight clutch.

Accordingly, the above recited objects of the present invention have been achieved by this arrangement. As will be appreciated by those with ordinary skill in the art, this particular design can be employed either as a clutch or as a brake; i.e., to provide a controllable rotary connection to a stationary structure or to a relatively rotatable member. For purposes of the present invention, the term "clutch" has been employed for the sake of clarity. It is to be understood that this term is intended to cover both clutch and brake units. Similarly, the input or drive can be reversed, such that these terms are dependent on the external drive connections inasmuch as torque may be transmitted in either direction. Thus, clutch "first" and "second" clutch members may broadly be used to describe the input pulley 12 and the hub 11.

What is claimed is:

1. An electromagnetic clucth for establishing drive between first and second clutch members comprising:
    a ferromagnetic inner body having a radial face portion drivingly connected to one of said members;
    a ferromagnetic armature drivingly connected to the other of said members positioned adjacent said inner body and having a radial face opposite said inner body radial face;
    means mounting said armature and inner body enabling relative axial movement to bring said radial faces into and out of driving engagement;
    return spring means urging said inner body and armature out of driving engagement;
    electromagnetic coil means positioned to cause said inner body and armature to be drawn into driving engagement upon energization;
    torque booster means including a ball plate element disposed adjacent said armature and having a radial face opposite a radial face of said armature, and a plurality of balls disposed in corresponding conical pockets formed in each of said radial faces of said ball plate element and said armature whereby torque is transmitted through said balls between said armature and said clutch element, and the driving engagement force between said armature and inner body radial face portion is thereby increased by the action of said balls;

a coupling plate axially spaced from said ball plate element and connected to said other member;

shock absorber means joined to said coupling plate and ball plate element and at least partially filling the axial space therebetween;

whereby said shock absorber means accommodates relative angular and axial movement between said first and second clutch elements, to reduce axial shock forces generated by said torque booster means.

2. The clutch according to claim 1 further comprising means for mounting said coupling plate to the other of said members.

3. The clutch according to claim 2 further including means accommodating axial movement between said ball plate element and said coupling plate comprising the reverse side of said formed conical pockets positioned adjacent openings in said coupling plate to thereby accommodate said relative axial movement therebetween.

4. The clutch according to claim 3 wherein said coupling plate is a formed member having an outer axially extending portion extending over said ball plate element.

5. The clutch according to claim 1 wherein said armature comprises an annular member, and including ball pocket inserts having said conical ball pockets formed therein.

6. The clutch according to claim 1 wherein said return spring means includes a spider spring having a plurality of arms emanating from a central axially fixed portion, said arms having circumferentially extending portions and terminal portions secured to said armature.

7. The clutch according to claim 6 wherein said armature includes ball pocket inserts secured thereto and wherein said terminal portions of said arms are secured beneath said inserts to provide said securement thereof to said armature.

8. The clutch according to claim 1 wherein said one clutch member includes a radial portion extending over said inner body and comprises said radial face portion of said inner body.

* * * * *

UNITED STATES PATENT OFFICE
CERTIFICATE OF CORRECTION

Patent No. 4,241,818  Dated December 30, 1980

Inventor(s) Donald Leroy Miller

It is certified that error appears in the above-identified patent and that said Letters Patent are hereby corrected as shown below:

Column 3, line 21, delete the numeral "15" and insert ----35----.

Column 3, line 27, after "38 and" insert ----each portion 50 is----. Same line, after "retained" insert ----to the armature 38----.

Column 3, line 28, after "beneath" insert ----the----.

Column 3, line 28, delete "52. Ball" and insert ----52. The ball----.

Column 3, line 29, delete "52 in turn" and insert ----52, in turn,----.

Column 3, line 35, after "armature" insert ----38----.

UNITED STATES PATENT OFFICE
CERTIFICATE OF CORRECTION

Patent No. 4,241,818  Dated December 30, 1980

Inventor(s) Donald Leroy Miller

It is certified that error appears in the above-identified patent and that said Letters Patent are hereby corrected as shown below:

Column 3, line 47, after "the" (first occurrence) insert ----conical----. Same line, delete the numeral "56" and insert ----60----.

Column 3, line 52, delete "Th" and insert ----The----.

Column 3, line 56, delete ", such" and insert ----so----.

Column 4, line 14, delete "uniroyal" and insert ----UNIROYAL----.

Column 4, line 49, delete "clucth" and insert ----clutch----.

Column 5, line 9, after "member;" insert ----and----.

Signed and Sealed this

Seventh Day of April 1981

[SEAL]

Attest:

RENE D. TEGTMEYER

Attesting Officer  Acting Commissioner of Patents and Trademarks